United States Patent [19]
Nobuyuki

[11] Patent Number: 5,541,916
[45] Date of Patent: Jul. 30, 1996

[54] ARBITRATION MECHANISM FOR AN ATM SWITCH

[75] Inventor: Oba Nobuyuki, Sendai, Japan

[73] Assignee: International Business Machines Corporation, Armonk, N.Y.

[21] Appl. No.: 273,523

[22] Filed: Jul. 11, 1994

[30] Foreign Application Priority Data

Aug. 20, 1993 [JP] Japan ................................ 5-206126

[51] Int. Cl.⁶ .......................... H04L 12/56; H04Q 11/04
[52] U.S. Cl. ..................... 370/60.1; 370/85.2; 370/85.6; 340/825.5; 340/825.8
[58] Field of Search ................................. 370/53, 54, 55, 370/56, 58.1, 58.2, 58.3, 60, 60.1, 61, 65.5, 85.1, 85.2, 85.6, 94.1, 94.2; 379/268, 271, 272, 291, 335; 340/825.02, 825.03, 826, 825.5, 825.51, 825.52, 825.79, 825.8

[56] References Cited

U.S. PATENT DOCUMENTS

| | | | |
|---|---|---|---|
| 4,897,833 | 1/1990 | Kent et al. | 370/85.2 |
| 5,126,999 | 6/1992 | Munter et al. | 370/60 |
| 5,157,654 | 10/1992 | Cisneros | 370/60 |
| 5,245,603 | 9/1993 | Newman | 370/85.2 |
| 5,327,420 | 7/1994 | Lyles | 370/60 |
| 5,367,518 | 11/1994 | Newman | 370/85.2 |
| 5,367,520 | 11/1994 | Cordell | 370/60 |

*Primary Examiner*—Alpus H. Hsu
*Attorney, Agent, or Firm*—Stephen T. Keohane

[57] ABSTRACT

An arbitration method uses no software for achieving fast switching in a large-scale asynchronous transfer mode switch of a cross-bar type. When two or more output requests directed to the same output port compete, NAND operations are carried out for each row of matrix between request signals for the output requests and one bit signals stored beforehand in matrix form. Then, wired OR operations are carried out on the results of NAND operations for each column of the matrix to obtain an internal signal Q for each column. Then, the complementary relationship between the order of the internal signals Q and the order on one row of one bit signals stored beforehand in matrix form is detected to generate an acknowledgement signal for the output request for the row with an order of complementary relationship. The arbitration process is performed very fast because all the processes are executed on hardware.

7 Claims, 8 Drawing Sheets

Arbiter

Form of an ATM Cell

N x N ATM Switch

ARBITRATION MECHANISM FOR AN ATM SWITCH

FIELD OF THE INVENTION

The present invention relates to a fast arbitration mechanism for an ATM (asynchronous transfer mode) switch.

PRIOR ART

In recent years, multimedia techniques for mixing and displaying multiple forms of data such as voices or images on one medium have been gathering attention. In multimedia, the switching technique plays as an important role as ever before but particularly, various types of data must be successfully supported by one switching circuit. That is, a switching circuit must satisfy various requirements depending upon the type of data. For example, instantaneity is the most ultimate requirement for audio information. If the sound is not communicated in a real time mode, the receiver of the information will have difficulty recognizing it correctly. On the other hand, for database information, being error-free is more strongly demanded than being in real time. This is because an error in data switching may cause serious problems such as transfer errors. For audio information, being error-free is not so important because human senses are not keen enough to recognize the error as a noise. Therefore, a small number of errors is tolerable in switching for audio information.

Thus, in multimedia, various properties are demanded of a single switching circuit. In recent years, asynchronous transfer mode (ATM) based switching has been drawing attention as a switching mechanism that satisfies this requirement. With such a switching method, data control in switching is very easy because the method specifies various forms of data in one predetermined format. As a result, a switching technique with a high throughput and a low delay can be realized.

ATM switches can be classified as follows in terms of the form of its internal configuration:

Cross-bar method

Banyan method

Time division method using a common memory

Configuration using a common media

Among the above, the cross-bar method is suitable for ATM switches because it is internally non-blocking and has a simple structure (that is, two packets directed to two different output ports do not collide with each other in any node in the switch).

However, this method also has the disadvantage that its switching speed is slower than that of the synchronous transfer mode. Although this does not Dose a serious problem if the scale of the switching system is small, e.g., 8 inputs×8 outputs, the delay in switching causes a significant problem if the switching system is on the scale of 64 inputs×64 outputs.

Such a delay occurs in relatively large-scale switching systems when arbitration takes time to resolve the competition of input cells. The word "competition" means that plurality of input cells are directed to the same port. Even in the competition state, only one input cell can be output from a specified output port at a time. Thus, it must be determined which cell should have output priority. This process is referred to as arbitration, and this arbitration process has been conventionally carried out with the partial involvement of software. However, it is very clear that such a software method reduces arbitration speed. That is, all the operations must be performed on hardware because too fast a speed is required to process each cell (packet). The arbitration mechanism in this case is very important in the implementation of fast switching and must respond and operate quickly.

OBJECTS OF THE INVENTION

Therefore, it is an object of this invention to provide fast switching in a large-scale ATM switch.

More specifically, it is an object of this invention to provide a fast arbitration process when input cells compete during switching.

In addition, fairness may be required for an arbitration process. That is, such an arbitration in which a cell input from a particular port always being selected to be the output preferentially is considered to be "unfair." Therefore, it is another object of this invention to maintain this fairness while achieving the fast arbitration as a primary object.

SUMMARY OF THE INVENTION

An arbitration method uses no software means for achieving fast switching in a large-scale asynchronous transfer mode switch of a cross-bar type. When two or more output requests directed to the same output port compete, NAND operations are carried out for each row of matrix between request signals for the output requests and one bit signals stored beforehand in matrix form. Then, wired OR operations are carried out on the results of NAND operations for each column of the matrix to obtain an internal signal Q for each column. Then, the complementary relationship between the order of the internal signals Q and the order on one row of one bit signals stored beforehand in matrix form is detected to generate an acknowledgement signal for the output request for the row with an order of complementary relationship, The arbitration process is performed very fast because all the processes are executed on hardware.

DESCRIPTION OF THE PREFERRED EMBODIMENT

One feature of this invention is that no software means is used to carry out arbitration in order to achieve this purpose, This feature allows fast arbitration, thus enabling much faster switching than that in the prior art with a relatively large-scale switch.

Figure 3:
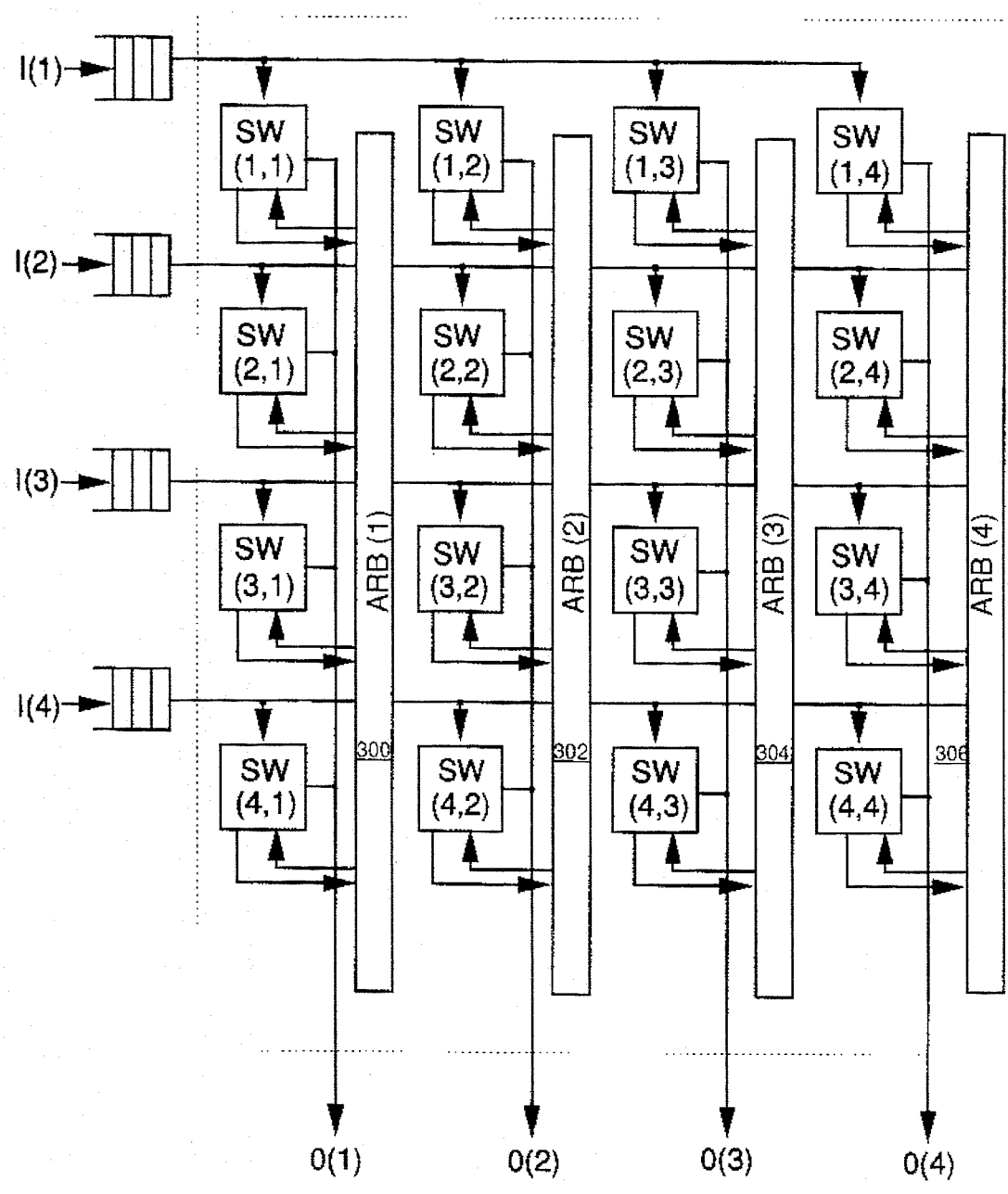
FIG. 3 is a block diagram illustrating a 4×4 implementations of this invention.

The cross-bar method is adopted for switching and an arbitration mechanism is provided for each output port (that is, each column) as shown in FIG. 3. These arbitration mechanisms can operate simultaneously and totally independently of each other.

Figure 6:
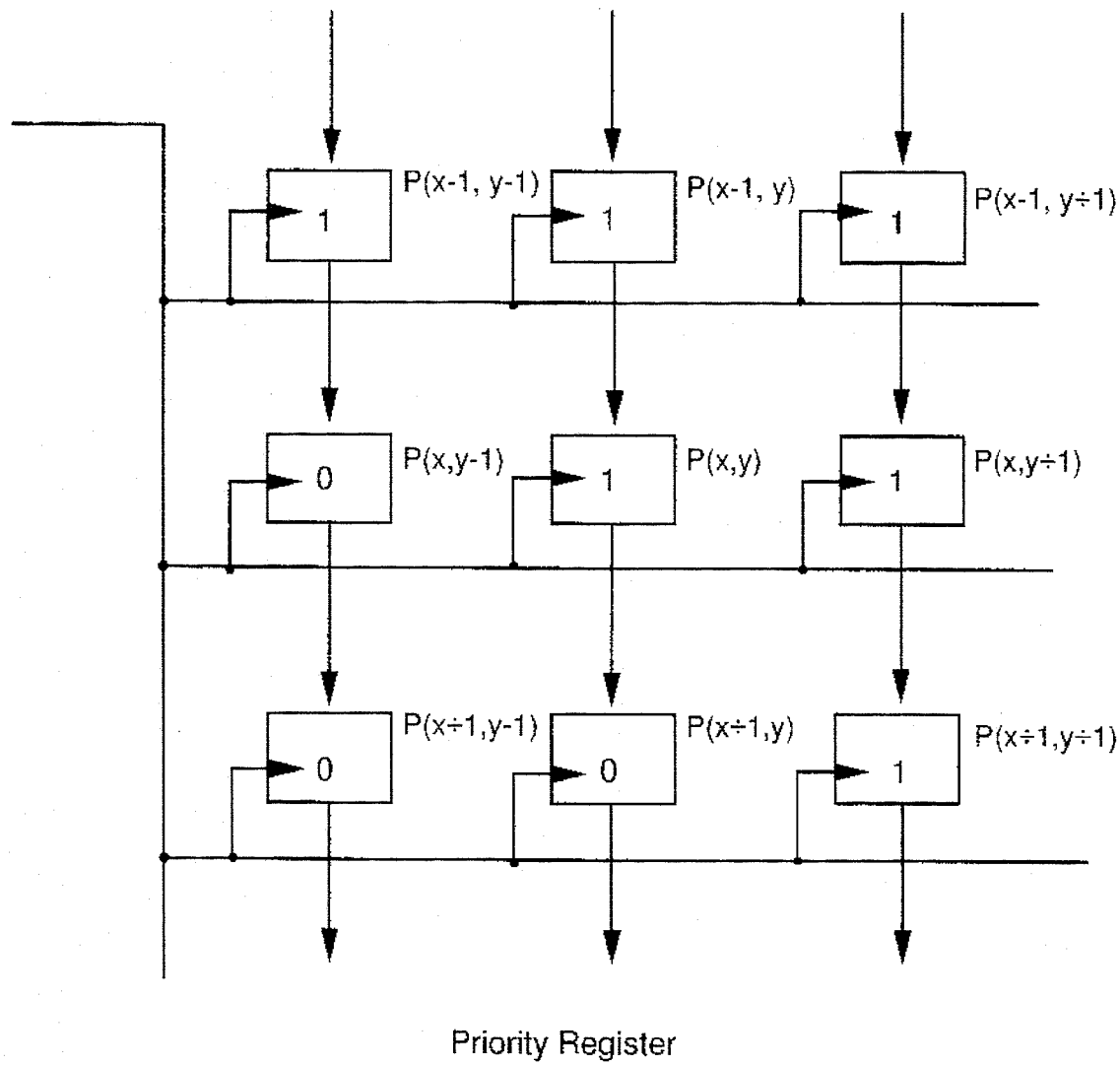
FIG. 6 illustrates priority registers contained in each arbiter.
Figure 7:
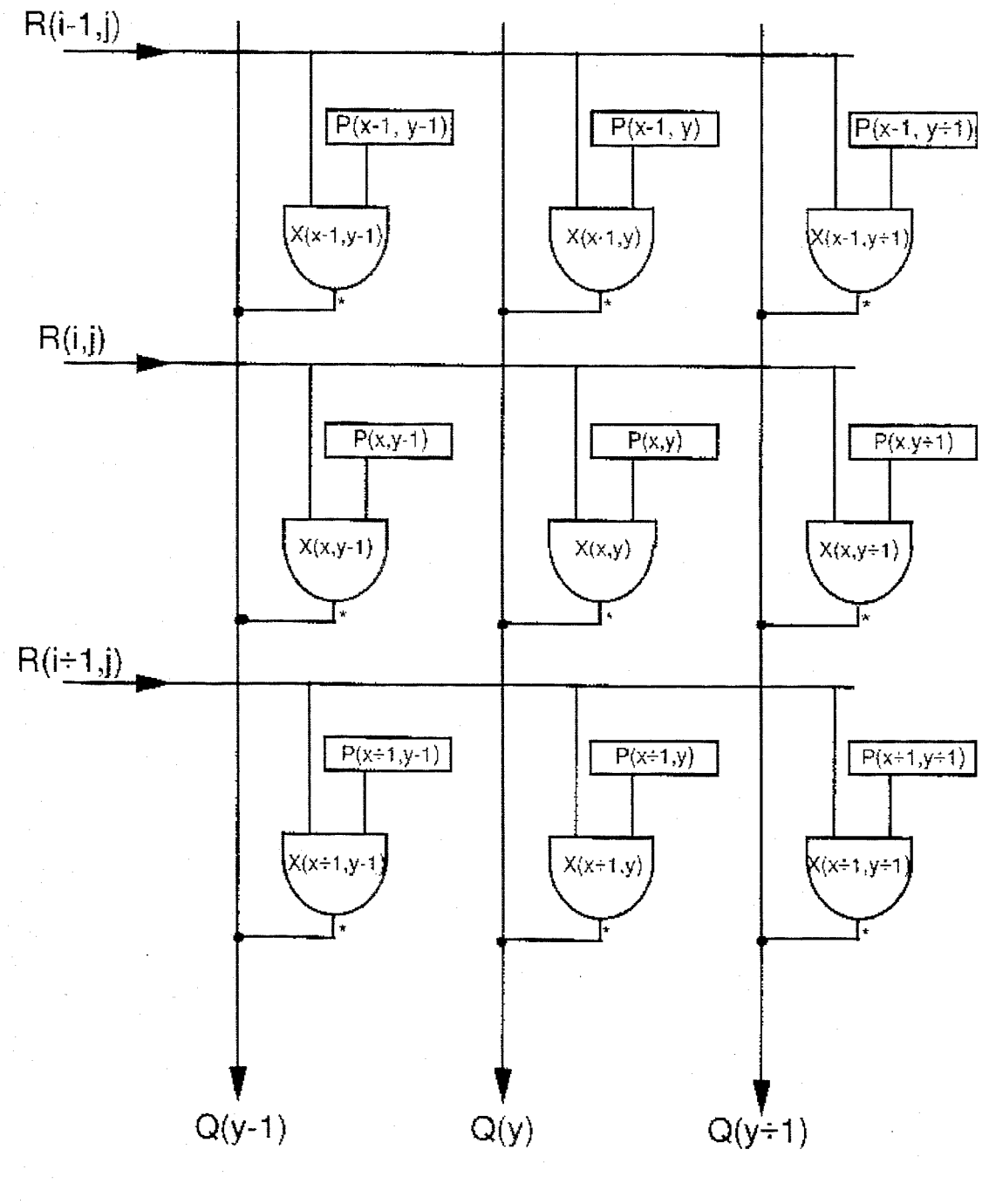
FIG. 7 illustrates NAND stage in the arbiter.
Figure 9:
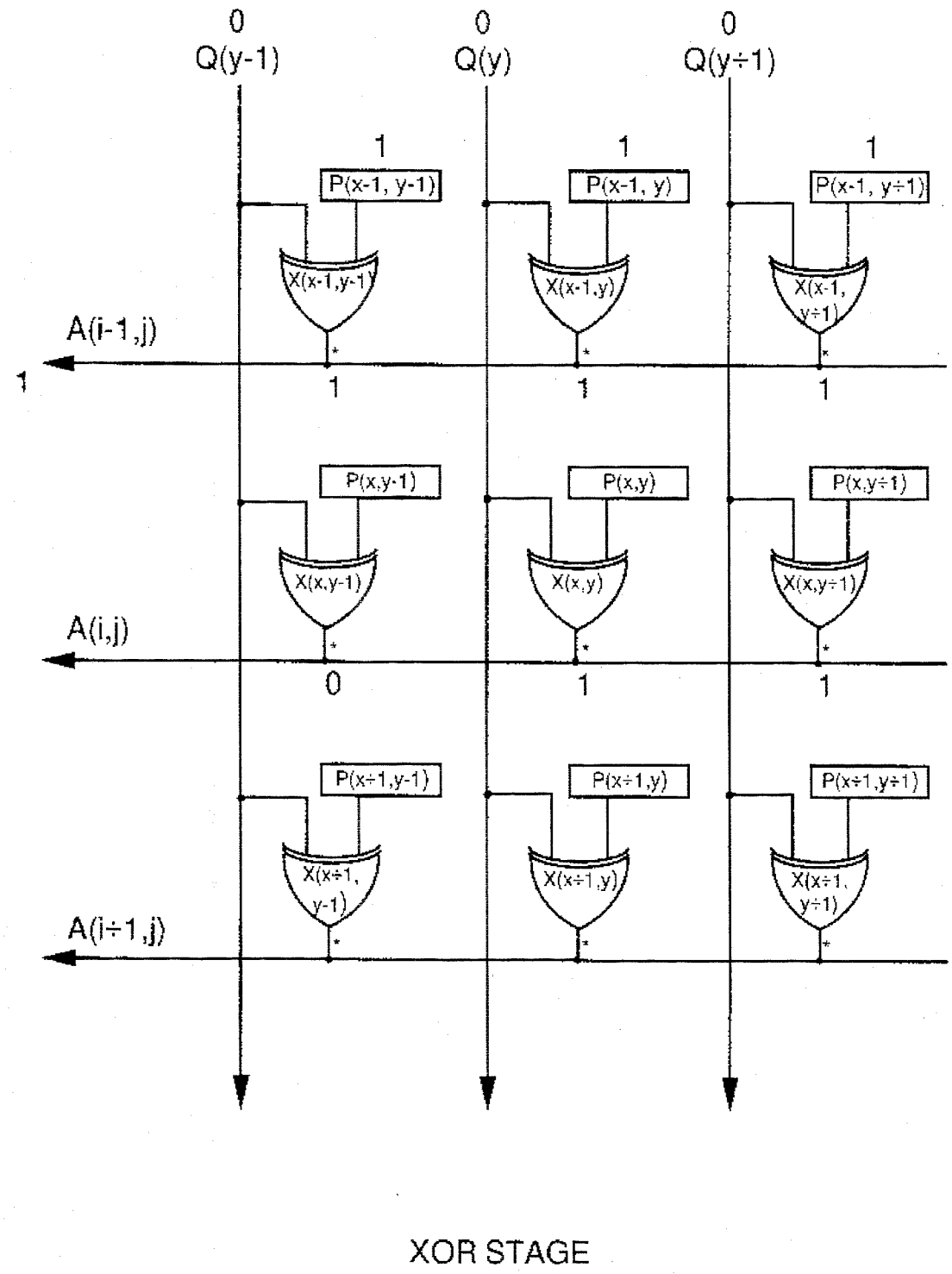
FIG. 9 illustrates XOR stage in the arbiter.

As shown in FIG. 6, priority registers, each of which stores specified binary bits, are provided in matrix form in each of the arbitration mechanics. In the arbitration process, as shown in FIG. 7, a NAND operation is made between a signal for an output in each cell (request signal) and the content of the priority register, and an internal signal Q for each request signal is derived by a wired OR operation on each column. Then, as shown in FIG. 9, an XOR operation is carried out, and then a wired OR operation is further carried out on each row. This step can automatically check whether a complementary relationship exists between the order of internal signals Q and the order and contents of the priority registers. If so, it is determined that the cell related to that request signal is the one to be output preferentially from an output port, and an acknowledgement signal indicating this is issued to the cell.

Therefore, such a combination of gates can provide an arbitration mechanism using only hardware.

In order to maintain the fairness of the arbitration, the bit is stored in each of the priority register cycles at every clock according to a certain equation (round robin method). This operation prevents the cell input from a particular input port from being always selected and output preferentially.

Figure 1:
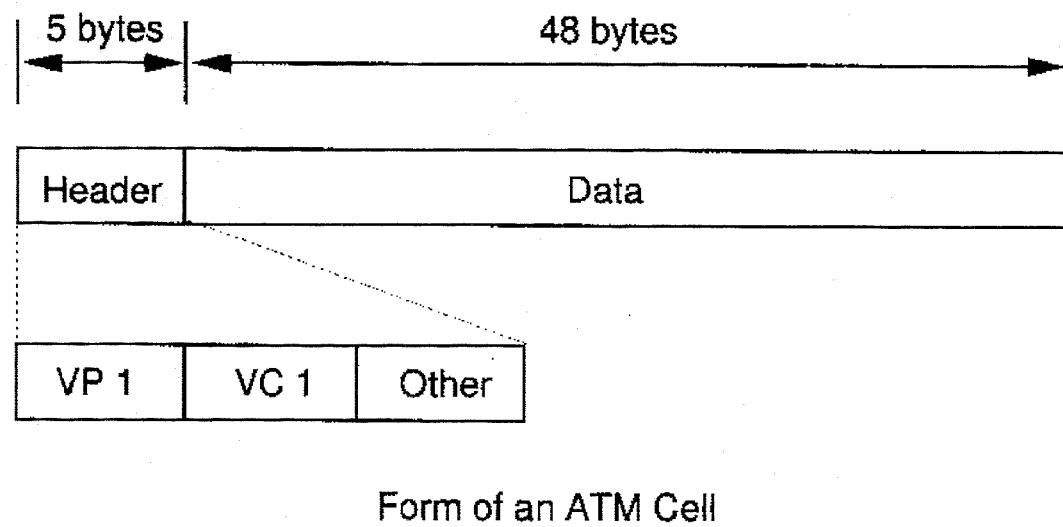
FIG. 1 illustrates the form of an ATM cell.
Figure 2:
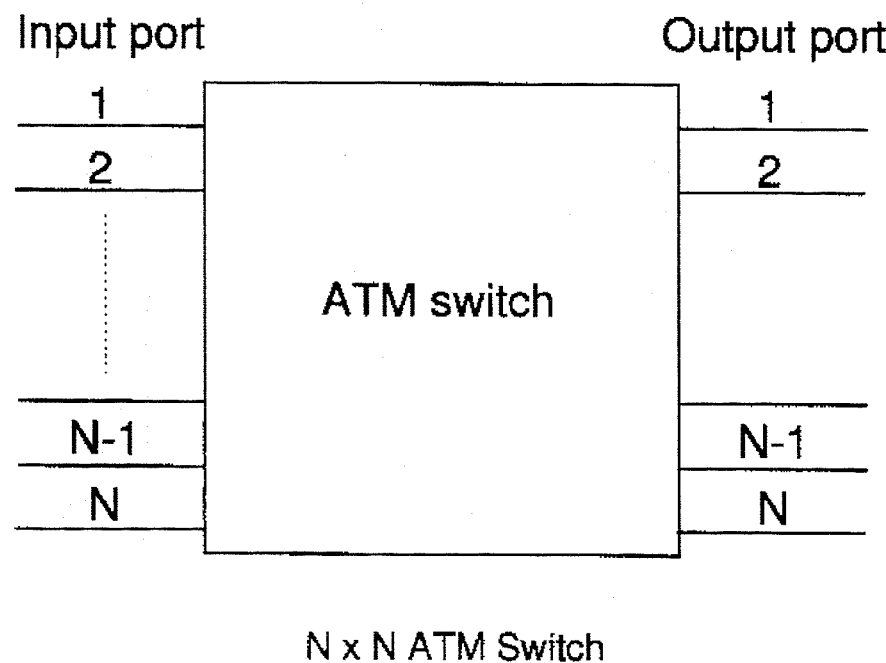
FIG. 2 illustrates an N×N ATM switch.

Before describing this invention in great detail, a routing method in an ATM switch is shown in FIGS. 1 to 3.

An ATM cell (packet) has a 5-byte header section and a 48-byte data section, as shown in FIG. 1. The header includes a virtual channel identifier (VCI) and a virtual path identifier (VPI). The VPI identifies a layer involved in multiplexing for each cell and classifies the VCI into some groups in terms of virtual paths which can be switched as one unit. Routing is controlled by referencing and changing the VCI and VPI. FIG. 2 discloses an ATM switch having N input ports and N output ports. In the most simple case, the VPI of the cell output from the i-th ($1 \leq i \leq N$) output port is set to (i). The ATM switch reads the VPI and transfers the cell to the i-th output port.

In the ATM switch, routing control is executed by referencing the VCI/VPI of the cells received. The VCI/VPI is replaced by a new VCI/VPI stored in a routing table. However, for simplicity, it is assumed in the following explanation that the header section of the cell holds information for the output port.

Figure 4:
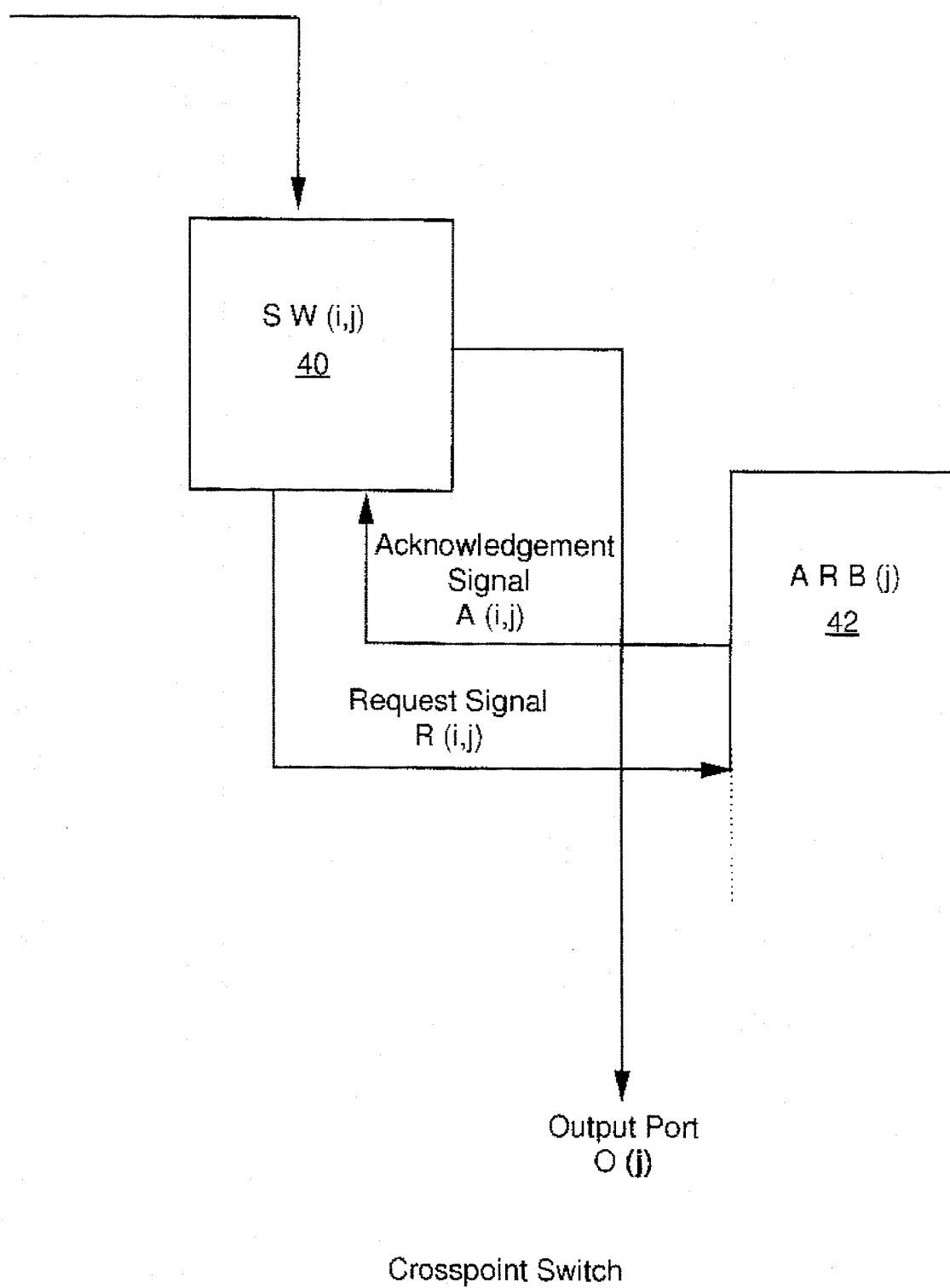
FIG. 4 is a block diagram of each crosspoint switch.

According to this invention, the ATM switch is implemented by a cross-bar based N×N crosspoint switch. FIG. 3 discloses a 4×4 cross-bar based ATM switch. This switch has a 16 crosspoint switch SW (i, j) ($1 \leq i, j \leq 4$). Each crosspoint switch SW includes a data switch and a decoder (not shown) for decoding an output port number O (j) ($1 \leq j \leq 4$). Crosspoint switches located on the same column share one arbiter ARB (j) 300, 302, 304, or 306 that arbitrates competition for the output port O (j). FIGS. 4 shows the exchange of signals between the crosspoint switch and the arbiter. When the crosspoint switch SW (i, j) 40 determines that a cell is directed to the output port O (j), it issues a request R (i, j) to an arbiter ARB (j) 42. If the arbiter ARB (j) 42 receives a plurality of requests from a plurality of crosspoint switches at the same time, it is responsible for preventing competition for the output port O (j), that is, arbitrating the competing requests.

In FIG. 3, it is assumed that a cell is received by an input port I (1) and is directed to an output port O (2). Four switches, that is, SW (1, 1), SW (1, 2), SW (1, 3), and SW (1, 4) read the header section of the cell at the same time. However, since the cell is directed to the output port O (2), only SW (1, 2) issues a request signal R (1, 2) to the arbiter ARB (2) 302. If no other cell is directed to the output port O (2) at the same time, the arbiter ARB (2) 302 issues an acknowledgement signal to SW (1, 2). After receiving the signal, SW (1, 2) receives the cell from the input port I (1) and transfers it to the output port O (2). Since all the switches SW (i, j) ($1 \leq i, j \leq 4$) and ARB (j) ($1 \leq j \leq 4$) can operate in parallel, the above process is carried out simultaneously for all the output ports and arbiters.

In the case above, there is no competition because only one cell is directed to a particular output port. In fact, however, in a cross-bar switch with a size of N×N, up to N input cells are possibly directed to one output cell at the same time. In this case, a maximum of N input cells may be directed to one arbiter simultaneously. An arbiter must select only one cell among them to be output from a particular output port and return an acknowledgement signal to the selected request. The arbitration process is involved in this selection step and the object of this invention is to perform this arbitration process quickly.

It is assumed that a cell C (i, j) represents a cell that arrives at an input port (i) and is directed to an output port (j). As described above, the header of the cell holds an output port number (j). The crosspoint switches continuously decode the output port number held in the header of the cell, and send requests to the arbiter.

Figure 5:
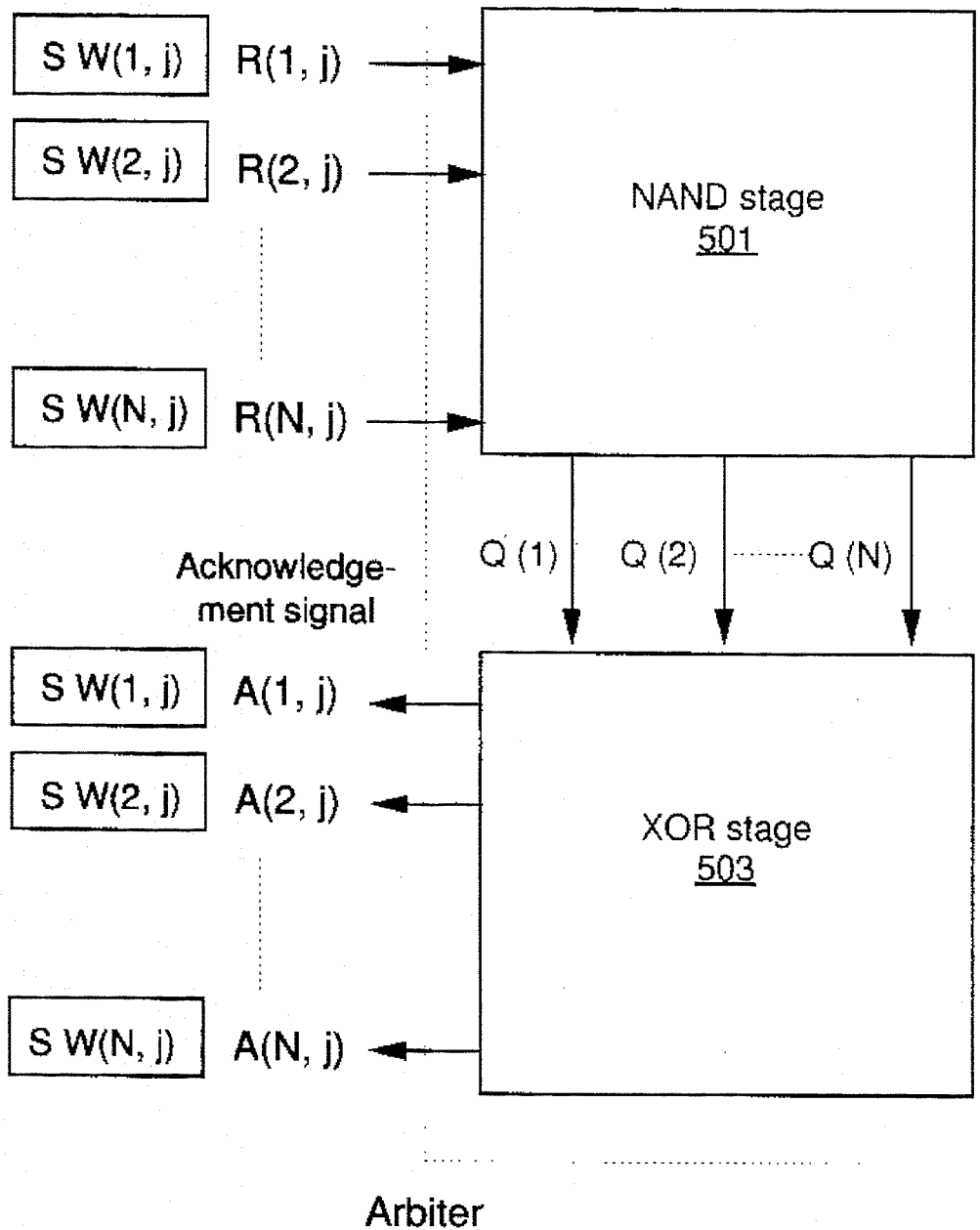
FIG. 5 illustrates the configuration of an arbiter according to this invention.

As shown in FIG. 5, the arbiter has two stages, that is, the NAND stage 501 and the XOR stage 503, each of which is connected to a priority register (not shown). On the NAND stage 501, the requests and the contents of the predetermined priority registers are calculated to obtain given results. On the XOR stage 503, the results are compared with the contents of the priority registers, and if they have a complementary relationship, the corresponding cell is determined as a preferred output cell. This is how arbitration is carried out. Thus, the wired OR connections can directly detect whether the internal outputs Q and the contents of the priority registers can have a complementary relationship, thus substantially reducing the number of logic gates. This process is further described below.

As shown in FIG. 6, a priority register P (x, y) ($1 \leq x, y \leq N$) has a one bit flip-flop and stores a predetermined a single bit. The content of the priority register and the request signal are calculated at a crosspoint X (x, y) in the NAND stage.

FIG. 7 shows the internal configuration of the NAND stage. This stage comprises $N^2$ crosspoints (only part of the stage is shown), each of which is connected to the corresponding priority register. Each crosspoint consists of a logic NAND gate. Output drivers for NAND gates are of an open collector type so that they can be directly linked to each other. This configuration allows simple and fast hardware operation regardless of the number of NAND gates linked. * marks in this figure represent wired OR gates. Such connection by means of wired OR gates allows the outputs of the gates to be directly connected to each other, eliminating the need to connect OR gates at many stages. This feature serves to implement fast arbitration. The results of wired OR operations are generated as internal signals Q (y) ($1 \leq y \leq N$) in the NAND stage. These internal signals Q (y) are used for comparison with the contents of the priority registers in the next XOR stage.

Figure 8:
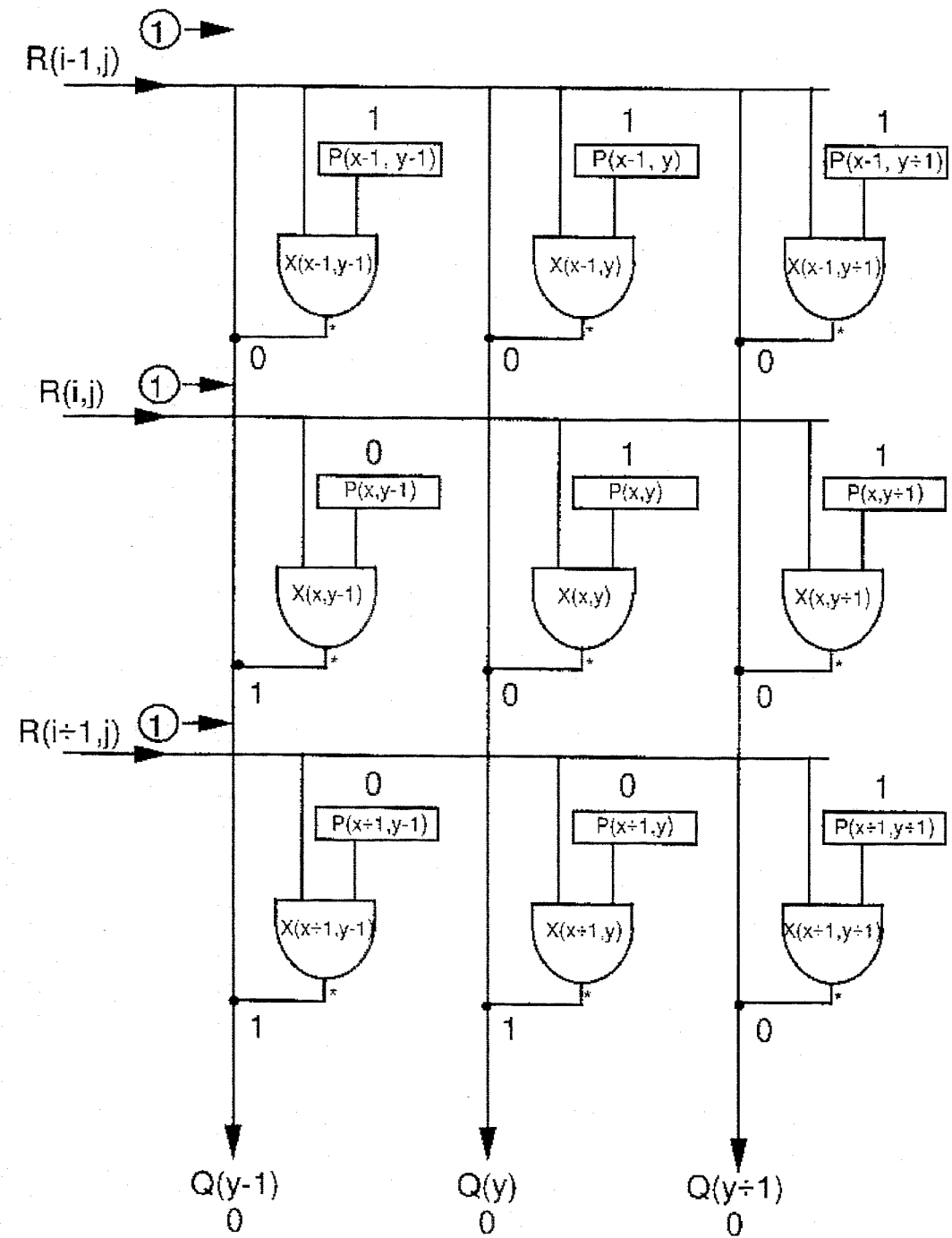
FIG. 8 illustrates the results of calculations when request signals are issued to NAND stage in the arbiter.

Now, it is assumed that the contents of the priority registers have already been determined, as shown in FIG. 6, and that a request signal R (i–1, j) has been input to the NAND stage. This situation is shown in FIG. 8. This input and the contents of priority registers P (x–1, y–1), P (x–1, y), and P (x–1, y+1) are calculated in NAND gates X (x–1, y–1), X (x–1, y), and X (x–1, y+1). In this case, all the outputs of the individual NAND gates are zero. At the same time, it is assumed that a request signal is input at both R (i, j) and R (i+1, j). This means that output requests are competing for a particular output port O (j). Then, similar operations for R (i, j) result in 1, 0, and 0 in the NAND gates X (x, y–1), X (x, y), and X (x, y+1), respectively. Similarly, calculations for R (i+1, j) result in 1, 1, and 0 in X (x+1, y–1), X (x+1, y), and X (x+1, y+1), respectively.

These results are for each row and wired-OR operations are further carried out on the results for each column. The operations result in internal signals Q (y–1), Q (y), and Q (y+1) which indicate 0, 0, and 0, respectively.

The subsequent XOR stage compares the results of the internal signals with the contents of the priority registers in a viewpoint of complementary relationship. FIG. 9 shows this stage. The stage consists of $N^2$ XOR gates and an internal signal Q and the content of a priority register are connected to the input of the XOR gate. In addition, the outputs of the XOR gates are wired-OR-connected to each other on every row to generate an acknowledgement signal A (i, j).

The operation of this stage is described using calculation examples. XOR operations are made between the internal signals Q (y–1), Q (y), and Q (y+1) and the contents of the priority registers, and then a wired OR operation is carried out for each row. Then, the result of operation for the first row A (i–1, j) is 1 and the results of operations for other rows are all zero. Since this result of operation A is an acknowledgement signal, only the request R (i–1, j) is selected and acknowledged for output. This entire process is nothing but an arbitration process.

Although the case in which requests are made on all of R (i–1, j), R (i, j), and R (i+1, j) has been described, a similar process takes place if requests are made to only R (i, j) and R (i+1, j). If calculations are continued by a similar method, the internal signals Q (y–1), Q (y), and Q (y+1) result in 1, 0, and 0, respectively. These results are used as inputs for the XOR stage, and XOR operations are made between them and the contents of the priority registers, resulting in no output on A (i–1, j), 1 on A (i, j), and 0 on A (i+1, j). Thus, in this case, the cell which issued the request signal R (i, j) corresponding to A (i, j) is selected through arbitration.

This process of arbitration can be described using general equations as follows. In the first stage, that is, NAND stage, the output of a crosspoint X comprises a process for a logic NAND operation between a request R (x, j) and a priority register P (x, y) and a process for a wired OR operation for each column as a result. That is, the former process is described by the following equation.

$$X^{NAND\text{-}STAGE}(x,y) = \overline{R(x,j) \cdot P(x,y)},$$

(• is a logic NAND operation symbol and the bar is a logic NOT operation symbol)

The latter process is described by the following equation.

$$Q(y) = \prod_{x=1}^{N} X^{NAND\text{-}STAGE}(x,y),$$

The symbol at the beginning of the right side represents a wired OR operation. As a result of this operation, an internal signal Q can be obtained.

The second stage, that is, XOR stage, comprises a process for a logic XOR operation between an internal signal Q (y) and the priority register P (x, y) and a process for a wired OR operation on the result of operation for each row. This process results in an acknowledgement signal A (i, j) as described by the following equation:

$$A(i,j) = \prod_{x=1}^{N} X^{XOR\text{-}STAGE}(x,j) = \prod_{x=1}^{N} \overline{Q(j) \oplus P(x,j)},$$

wherein the symbol between Q (j) and P (x, j) represents an XOR operation.

When this method is used to carry out for arbitration, the request signal for the row with more priority registers having binary bit 1 is always selected eventually by the process. In this example, the x–1 row has more priority registers having binary value 1 than the (x) row. Therefore, if request signals compete for these two rows, the request signal corresponding to the former always obtains priority. This is both an advantage and disadvantage of this invention. This method is sufficient for switching when specific priorities should have been predetermined. All that is required is to connect the request signal for the input port with high priority to the row with more registers having binary value.

However, fair arbitration without predetermined priorities is sometimes desired. It is not reasonable in this case to directly apply this method to arbitration. Therefore, such fair arbitration requires a step to gradually change the contents of the priority registers. Such a change is based on the following aspects. It is assumed that the priority register P (x, y) is in initial state at time 0. The initial state can be described by the following equation.

$$P(x,y)^{t=0} = \begin{bmatrix} 1 & (x \leq y) \\ 0 & (x > y) \end{bmatrix}$$

For example, if N=4, the content bit of priority registers can be described by the following equation:

$$P(x,y)^{t=0}_{1 \leq x,y \leq 4} = \begin{bmatrix} 1111 \\ 0111 \\ 0011 \\ 0001 \end{bmatrix}$$

During the next arbitration cycle, the content bits of the priority registers are changed according to the following equation:

$$p(x,y)^{t+1} = P(X-1,y)^t$$

An actual change which occurs to the bits stored in priority registers is exemplified as follows:

$$\rightarrow \begin{bmatrix} 1111 \\ 0111 \\ 0011 \\ 0001 \end{bmatrix}^{t=0} \rightarrow \begin{bmatrix} 0001 \\ 1111 \\ 0111 \\ 0011 \end{bmatrix}^{t=1} \rightarrow \begin{bmatrix} 0011 \\ 0001 \\ 1111 \\ 0111 \end{bmatrix}^{t=2} \rightarrow \begin{bmatrix} 0111 \\ 0011 \\ 0001 \\ 1111 \end{bmatrix}^{t=3}$$

As described above, according to this arbitration method, the request signal for the row with more priority registers having binary value has a better possibility of obtaining priority. Thus, gradually changing the content bits of the priority registers as stated above will achieve a fair arbitration.

For ease of understanding, this invention has been described in conjunction with a 4×4 crosspoint switch structure, but it can be applied to a larger-scale crosspoint switch.

According to this invention, arbitration is carried out very quickly because arbitration mechanisms, each of which is responsible for one output port, operate in parallel and the implementation consists of a combination of simple gates such as NAND and XOR gates without using any software means. In addition, the use of wired OR connections reduces the number of gates and makes the delay time associated with arbitration independent of the number of I/O ports. Therefore, this method can be applied to very large switches of, for example, 64 I/O ports or more without the loss of fast arbitration feature. Furthermore, arbitration is carried out fairly because the content bits of the priority registers change time to time based on round robin scheduling.

What is claimed is:

1. In a cross-bar type asynchronous transfer mode switch, a method for arbitrating two or more competing output requests directed to the same output port, comprising the steps of:

carrying out NAND operations between request signals for said output requests and one bit signals stored beforehand in a matrix, said matrix comprising a plurality of rows and a plurality of columns. for each row of said matrix;

carrying out wired OR operations on the results of said NAND operation for each column of said matrix to obtain internal signal Q;

detecting the complementary relationship between the order of the internal signal Q and the order on one row of said one bit signals stored beforehand in matrix form; and generating an acknowledgment signal for said output request for said row detected on said detecting step.

2. The arbitration method of claim 1 wherein said steps of detection and generating an acknowledgement signal are carried out by XOR operations between said internal signals and said 1 bit signals stored beforehand in matrix form and making wired OR operations on the results of said XOR operations for each row.

3. The arbitration method of claim 1 or 2 wherein said 1 bit signals stored beforehand in matrix form have their arrays changed according to a specified equation at a certain interval.

4. The arbitration method of claim 3 wherein said certain interval corresponds to a clock cycle.

5. In an N×N cross-bar based asynchronous transfer mode switch, a device for arbitrating two or more competing output requests directed to the same output port, said device provided for each output port comprising:

priority registers arranged as an N×N matrix, said matrix having a plurality of rows and a plurality of columns, each of which stores a predetermined single bit, $N^2$ NAND circuits each of them having a request signal corresponding to one of said output request and said single bit stored in said priority registers as its input, and having its output wired-OR-connected to each other output of said NAND circuit for each column of said matrix; and $N^2$ XOR circuits each of them having said results of wired OR operations for each column and said single bits stored in said priority registers as its input, and having outputs wired-OR-connected to each other output of said XOR circuit for each row of said matrix.

6. The device of claim 5 wherein the contents of said priority registers are changed at a certain interval according to a specified equation.

7. A switch using cross-bar based asynchronous transfer mode having N input ports and N output ports, wherein one arbitration device is connected to each crosspoint switch group sharing one output port, comprising:

priority registers arranged as an N×N matrix, said matrix having a plurality of rows and a plurality of columns, each priority register storing a predetermined single bit, $N^2$NAND circuits each of them having a request signal corresponding to one of said output request and said single bit stored in said priority registers as its input, and having its output wired-OR-connected to each other output of said NAND circuit for each column of said matrix; and $N^2$XOR circuits each of them having said results of wired OR operations for each column and said single bits stored in said priority registers as its input, and having outputs wired-OR-connected to each other output of said XOR circuit for each row of said matrix.

* * * * *